United States Patent [19]

Muller et al.

[11] Patent Number: 5,069,559

[45] Date of Patent: Dec. 3, 1991

[54] BEARING WITH SELECTABLE ELECTRICAL CONDUCTIVITY

[75] Inventors: Hans Muller, Hanover; Joachim Trapp, Laatzen, both of Fed. Rep. of Germany

[73] Assignee: Renk Aktiengesellschaft, Augsburg, Fed. Rep. of Germany

[21] Appl. No.: 642,909

[22] Filed: Jan. 18, 1991

[30] Foreign Application Priority Data

Jan. 27, 1990 [DE] Fed. Rep. of Germany ....... 4002402

[51] Int. Cl.⁵ .................... F16C 17/12; F16C 19/50
[52] U.S. Cl. ................................ 384/277; 384/476; 384/906
[58] Field of Search ............... 384/192, 206, 277, 478, 384/476, 495–498, 624, 906

[56] References Cited

U.S. PATENT DOCUMENTS

| | | | |
|---|---|---|---|
| 1,998,888 | 4/1935 | Wallgren | 384/277 |
| 2,455,166 | 11/1948 | Firth | 384/906 X |
| 3,924,906 | 12/1975 | Kitaoka | 384/476 |
| 4,109,976 | 8/1978 | Ernst et al. | 384/277 |
| 4,267,461 | 5/1981 | Grassmann | 384/624 X |
| 4,606,656 | 8/1986 | LaRue | 384/498 X |
| 4,997,293 | 3/1991 | Ono et al. | 384/476 |

Primary Examiner—Thomas R. Hannon
Attorney, Agent, or Firm—Natter & Natter

[57] ABSTRACT

A spherical bearing with selectable electrical conductivity includes a bearing body having a spherical supporting surface, a layer of electrically insulating material and a housing having a concave spherical seating surface which form a ball joint having a center around which the bearing body may swivel relative to the housing when the housing is not clamped against the insulating layer and bearing body with the force required for operation of the bearing. A first positioning pin of electrically conductive material projects radially through the insulating layer and into a recess formed in the housing. Electrical connection between the housing and the bearing body is provided by a compression spring which bears against the recess and the first positioning pin. A second positioning pin of electrically insulating material may be selected in lieu of the first positioning pin and spring to provide a bearing configuration wherein the body is insulated from the housing.

7 Claims, 2 Drawing Sheets

BEARING WITH SELECTABLE ELECTRICAL CONDUCTIVITY

BACKGROUND OF THE INVENTION

1. Field of the Invention

This invention relates generally to spherical i.e. ball an socket, bearings and more particularly to bearing configurations which provide desired electrical conductivity characteristics between a bearing body and a bearing housing.

2. Background History

Ball and socket bearings have been employed in conjunction with drive systems wherein shafts were not in alignment. Such bearings included a bearing body having a ball, spherical, or a spherical sector shaped surface, that is, a convex surface defined by a sphere cut along two parallel planes equidistantly spaced from its geometric center. The bearing bodies included either a single or a plurality of sector shaped surfaces.

The bearing body was seated in a two part housing having mating concave socket surfaces The housing parts were separated along a plane passing through the geometric center of the socket as well as the bearing body.

To assemble the bearing with a shaft in a drive system, the housing parts were not tightly connected until the shaft and housing were positioned in the system. The body and shaft self aligned relative to the housing during positioning After positioning, the housing parts were tightened together and the bearing body was prevented from further movement relative to the housing. During normal operation the bearing body did not move relative to the housing in order to preclude wear on both the convex bearing body surfaces and the concave socket surfaces.

In order to prevent unlimited random movement of the bearing body relative to the housing during assembly, a motion limiting pin projected radially from the body. The pin was received in an oversized recess in the concave socket surface. The body remained capable of movement relative to the housing for adjustment of the shaft and body. Movement was limited by contact between the positioning pin and a wall of the recess.

In some drive system applications, the bearing body and shaft were required to be electrically connected with the housing, e.g. to divert electrical currents or charges. In other applications, however, it was desired to electrically isolate the bearing body from the housing, e.g. to preclude electrical creep currents which could result in electrolytic action at mating surfaces.

When electrical isolation was not required, the convex spherical surface of the body was in direct contact with the concave socket surfaces of the housing and a metal positioning pin was utilized. If electrical isolation was required, it was necessary to electrically insulate the positioning pin from the housing and, in addition, a layer of electrically insulating material was required to be placed between the bearing body and the convex socket surfaces of the housing.

As a result, for drive systems having the same working load and drive system dimensional requirements different housings and/or bearing bodies were required, depending upon the electrical conductivity characteristics specified. In order to accommodate the thickness of the insulating layer positioned between the bearing body and the housing in electrically isolated applications, one was required to employ either two different sizes of bodies or housings, one for the assembly of an electrically isolated bearings and one for the assembly of electrically conductive bearings.

Additionally, bearing bodies and housings were required to be manufactured within strict dimensional tolerances because of the fit required between the mating convex and concave surfaces of the body and the housing as well as to assure that the housing parts were joined and sealed oil tight.

SUMMARY OF THE INVENTION

A ball and socket bearing includes a bearing body having a convex spherical sector shaped surface and a bearing housing which includes concave socket surfaces. A compressible insulating ring is positioned between the mating surfaces of the bearing body and housing.

Extending from the bearing body through an opening in the insulating ring and into a recess formed in the housing socket surface is a radial positioning pin. In applications wherein the bearing body is to be electrically connected to the housing, the pin is formed of electrically conductive material and is maintained in electrical contact with the housing by a spring which is compressed between the end of the recess and the pin. When the body is to be electrically isolated from the housing, an alternate pin of nonconductive material is utilized without the spring.

From the foregoing compendium, it will be appreciated that it is a consideration of the present invention to provide a bearing with selectable electrical conductivity of the general character described which is not subject to the disadvantages of the background history aforementioned.

A further consideration of the present invention is to provide a bearing with selectable electrical conductivity of the general character described which may be configured for electrically isolated or electrically conductive applications without requiring different bearing bodies or bearing housings.

It is an aspect of the present invention to provide a bearing with selectable electrical conductivity of the general character described which is relative low in cost.

An aspect of the present invention is to provide a bearing with selectable electrical conductivity of the general character described which is relatively simple to assemble in a selected electrical conductivity state.

To provide a bearing with selectable electrical conductivity of the general character described which is well suited for manufacture by mass production fabrication techniques is yet a further consideration of the present invention.

To provide a bearing with selectable electrical conductivity of the general character described which may be manufactured with greater dimensional tolerances than heretofore required is a further feature of the present invention.

A further aspect of the present invention is to provide a bearing with selectable electrical conductivity of the general character described wherein a desired electrical conductivity state may be selected by choosing either an electrically conducting or an electrically insulating positioning pin.

Another consideration of the present invention is to provide a bearing with selectable electrical conductivity of the general character described wherein an electrical connection is maintained between bearing body and a bearing housing only through an electrically conductive positioning pin which projects radially from the bearing body into a recess formed in the bearing housing and a spring which is compressed between the recess and the positioning pin.

Yet a further consideration of the present invention is to provide a bearing with selectable electrical conductivity of the general character described wherein a recess is provided in a bearing housing and one of two positioning pins is selectably secured to a bearing body in a position projecting radially from the bearing body into the recess with one of the positioning pins being electrically conductive and the other being nonconductive.

Other aspects, features and consideration the present invention in part will be obvious and in part will be pointed out hereinafter.

With these ends in view, the invention finds embodiment in the various combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF DRAWINGS

In the accompanying drawings, in which are shown one of the various exemplary embodiments of the invention.

DESCRIPTION OF THE PREFERRED EMBODIMENT

Figure 1:
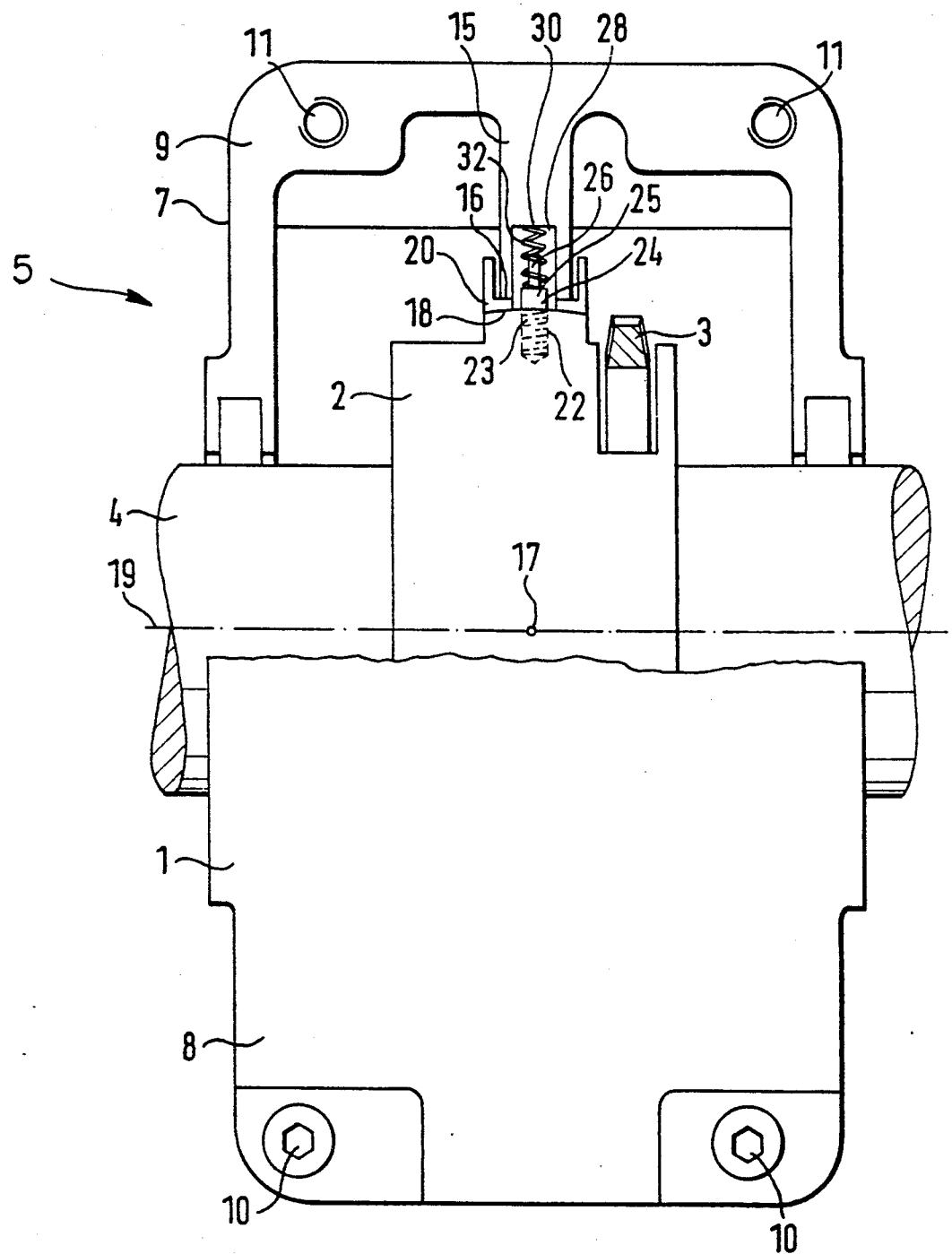
FIG. 1 is a plan view of a bearing assembly constructed in accordance with an embodying the invention and showing a bearing body having a spherical sector shaped surface seated in a two part bearing housing and with a portion of an upper housing part being broken away to expose a lower housing part and illustrating the bearing in an electrically conductive configuration.

Referring now in detail to the drawings, the reference numeral 5 denotes generally a ball and socket bearing assembly constructed in accordance with an embodying the present invention. The bearing assembly 5 includes a bearing body 2 having one or more convex spherical sector shaped surfaces 18 which comprise a surface defined by a sphere cut along two parallel planes equidistantly spaced from a geometric sphere center 17. The bearing body 2 is carried in a housing denoted generally by the reference numeral 1 and having an upper housing part 8 and a lower housing part 7.

Journalled in the bearing body 2 is a shaft 4 having an axis of rotation 19 which extends through the center 17. The bearing body 2 includes a conventional oil ring 3 driven by the shaft 4. Lubricating oil is drawn from a sump in the bearing housing 1 by the oil ring 3. The oil flows along the top of the bearing body and between the bearing body and the journalled portion of the shaft 4.

As previously mentioned, the housing 1 includes an upper 8 and a lower 7 housing parts. The parts are joined along planar mating surfaces. Illustrated in FIG. 1 is the mating surface 9 of the lower housing 7. The housing parts are clamped oil tight along the planar mating surfaces through the employment of bolts 10 which extend through apertures in flange portions of the upper housing part 8 and into registered threaded bores 11 of the lower housing part 7.

In a conventional manner, the bearing body 2 is also formed of two parts comprising a lower bearing pillow and an upper bearing pillow with the planar mating surfaces of the pillows lying in the same plane as the planar mating surfaces of the housing parts.

At the axial center of the housing 1, an annular web 15 projects radially inwardly toward the bearing body 2. The inner face of the web 15 defines a concave spherical sector shaped socket surface 16. The geometric center of the concave socket surface 16 coincides with the center 17

Clamped between the surface 18 and the concave socket surface 16 is a ring 20 of compressible electrically insulating material. The ring 20 isolates the bearing body 2, formed of electrically conductive material, from the housing 1, which is also formed of electrically conductive material.

The ring 20 is formed of a compressible elastic material so that when the upper housing part 8 is placed over the lower housing part 7 and clamped to the lower housing part 7 through the use of the bolts 10, the ring 20 is compressed by at least 0.1 mm. Because of the radial compressibility of the ring 20, the housing parts 7 and 8 as well as the bearing body 2 can be machined with greater dimensional tolerances than previously employed in spherical bearing assemblies wherein no insulating ring was employed or in bearing assemblies wherein the insulating ring comprised a thin incompressible layer of material.

As previously mentioned, a positioning pin is employed to permit limited movement of the bearing body 2 relative to the housing during assembly of components and prior to clamping the housing parts together. As illustrated in FIG. 1, a positioning pin 24 is formed of electrically conductive material and includes a lower threaded section 23 which is seated in a tapped radial bore 22 of the bearing body 2.

The positioning pin 24 includes an annular collar 25 and an axially extending reduced diameter post 26. Both the collar 25 and the post 26 project through an aperture formed in the insulating ring 20 and through the concave socket surface 16 of the lower housing part 7 into a recess or well 28 formed in the web 15.

In order to assure continuous electrical conductivity between the housing 1 and the bearing body 2, an electrically conducting helical compression spring 32 is seated about the post 26 with one of its ends bearing against the collar 25 and the other end bearing against a base 30 of the recess 28.

The positioning pin 24 and compression spring 32 permit the bearing body 2 to move relative to the housing 1 since the positioning pin 24 is both radially and axially spaced from the walls of the recess 28. Thus, as long as the housing parts 7 and 8 are not yet firmly clamped to one another by the bolts 10, the bearing body 2 may move relatively to the housing with such movement being limited only by the clearance afforded between the collar 25 and the recess.

Because of the electrical conductivity of the positioning pin 24 and the compression spring 32, such components provide a reliable and constant electrical connection between the bearing body 2 and housing 1.

It should be appreciated that the positioning pin 24 and compression spring 32 may extend into a well or recess in the upper housing part 8 in lieu of or in addition to the lower housing part 7. It should also be appreciated that in order to provide for radial compressibility of the insulating ring 20 of at least 0.1 mm, the radial thickness of the ring 20 in a normal, uncompressed state must be at least 0.2 mm.

Figure 2:
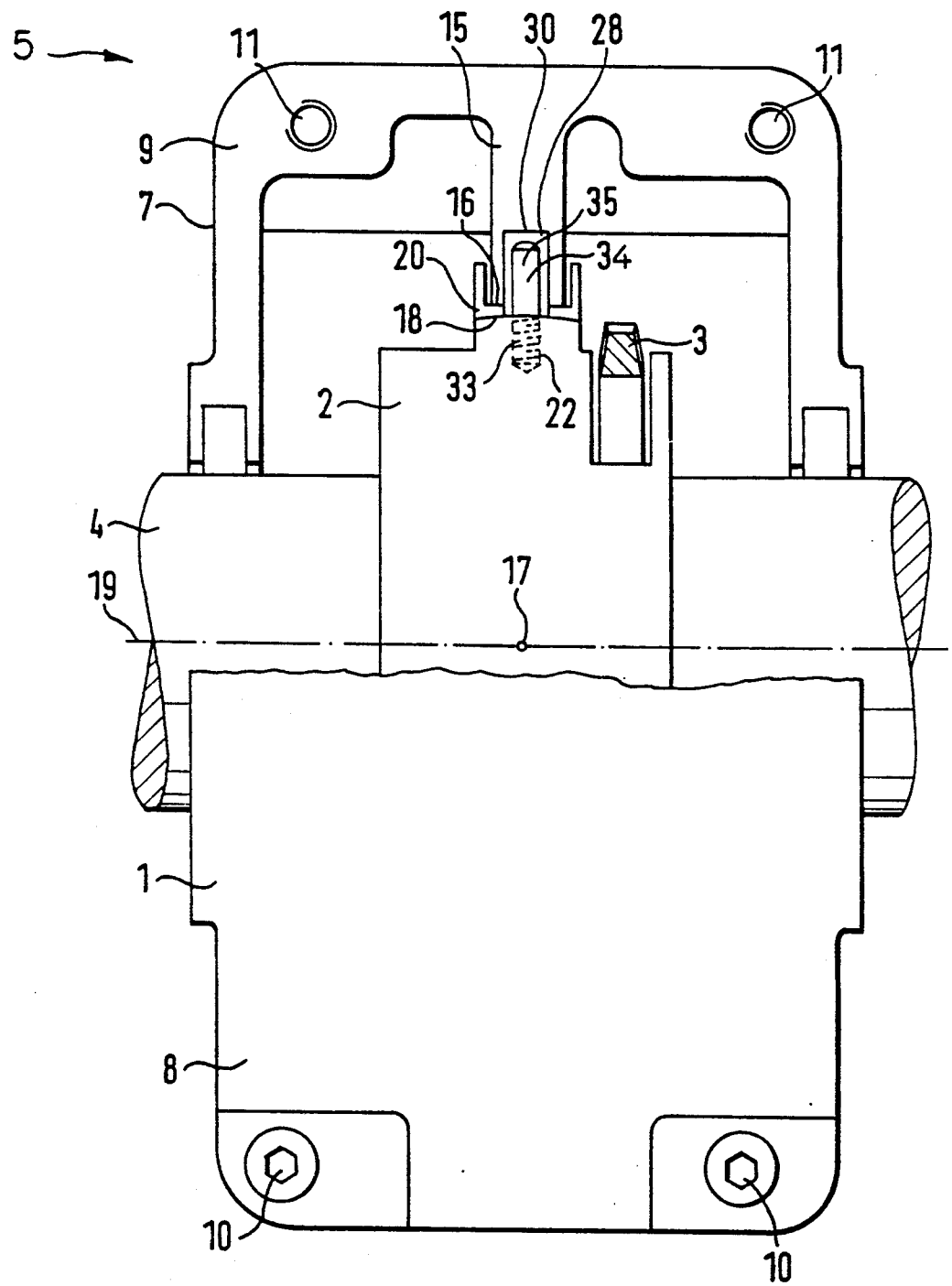
FIG. 2 is a plan view of the bearing assembly identical to of FIG. 1, except, however, showing the bearing in an electrically nonconductive configuration.

Turning now to FIG. 2 wherein the bearing assembly 5 is illustrated in an electrically isolated configuration, it should be noted that the positioning pin 24 and compression spring 32 have not been utilized. In lieu of such components, a positioning pin 34 of electrically insulating material, such as a plastic, has been employed.

The positioning pin 34 includes a lower treaded section 33 which is seated in the tapped radial bore 22 of the bearing body 2 and a radially outwardly projecting collar, 35 similar to the collar 25 of the positioning 24. In order to afford interchangeability of components, the threaded section 33 of the positioning pin 34 is of the same thread size as the threaded section 23 of the positioning pin 24.

The collar 35 of the positioning pin 34 is preferably of the same diameter as the collar 25. Thus, essentially the same clearance is provided between the positioning pin 34 and the walls of the recess 28 as between the positioning pin 24 and the walls of the recess 28. In the event the positioning pin 34 contacts the walls of the recess 28, the bearing body will remain electrically isolated from the housing 1 since the pin 34 is formed of electrically insulating material.

It is therefore evident that by simply assembling the positioning pin 34 in lieu of the positioning pin 24 and compression spring 32, the bearing assembly 5 wherein the bearing body 2 is electrically isolated from the housing 1 will be provided.

The bearing assembly 5 maintains the same functional characteristics with the exception of electrical conductivity. For such purpose, it is required that the threaded bore 22 and the recess 28 as well as the positioning pin 24 and the positioning pin 34 are so dimensioned as to facilitate mutual exchange of positioning pins while maintaining the same mechanical functions. Thus, not only do the threaded sections 23, 33 have the same thread size but, in addition, the diameter of the collars 25, 35 are identical so that the same degree of limited movement is provided in either configuration.

It should be understood that various modifications of the invention without departing from the spirit thereof will be evident to those of skill in the art. For example, the bearing assembly 5 in the FIG. 1 configuration may be converted to an electrically isolated bearing assembly without substituting the insulating positioning pin 34 for the positioning pin 24 and compression spring 32. The compression spring 32 may be removed and an insulating sleeve may be positioned over the post 26 and collar 25. It should also be appreciated that the concave socket seating surface 16 and the convex sector shaped surface 18 of the bearing body 2 may comprise a plurality of spherical sectors having a common center 17 rather than single sectors.

Thus, it will be seen that there is provided a bearing with selectable electrical conductivity which meets the various aspects, features and considerations of the present invention and which is well suited to meet the conditions of practical usage.

As various changes and modifications might be made in of the invention as above set forth, it is to be understood that all matter herein described or shown in the accompanying drawings is to be interpreted as illustrative and not in a limiting sense.

Having thus described the invention, there is claimed as new and desired to be secured by letters patent:

1. A kit for assembly of a spherical bearing with selectable electrical conductivity, the kit comprising a bearing housing of electrically conductive material, a bearing body of electrically conductive material and a layer of electrically insulating material adapted to be positioned between the body and the housing, the body having an annular convex supporting surface, the housing having an annular concave seating surface, the seating surface, the insulating material and the supporting surface forming a ball and socket joint having a center around which the body is swivelable relative to the housing when the insulating material is not clamped with the force required for operation of the bearing, the kit further including first means for limiting movement of the body relative to the housing, the first means including means for providing an electrical connection between the housing and the body, the kit further including second means for limiting movement of the body relative to the housing, the second means including means for electrically insulating the body from the housing in the event the second means contacts both the body and the housing, the first and the second means for limiting movement of the body relative to the housing being interchangeable and one of the said means for limiting movement being selected for a bearing assembly depending on the electrical conductivity requirements of a specified bearing application.

2. A kit for assembling a spherical bearing with selectable electrical conductivity as constructed in accordance with claim 1 wherein the housing includes a recess, both means for limiting movement of the body relative to the housing being adapted to project from the body into the recess, movement of the body relative to the housing being limited by contact between the selected means for limiting movement and a wall of the recess.

3. A kit for assembly of a spherical bearing with selectable electrical conductivity as constructed in accordance with claim 2 wherein the first means for limiting movement of the body relative to the housing comprises a positioning pin formed of electrically conductive material, the body includes a bore, the pin being adapted to seat in the bore and project radially from the body into the recess, the means for providing an electrical connection between the housing and the body including a compression spring, the compression spring being formed of electrically conductive material, the compression spring being adapted to simultaneously engage both the recess and the pin.

4. A kit for assembly of a spherical bearing with selectable electrical conductivity as constructed in accordance with claim 1 wherein the electrically insulating material is formed of elastic material which is compressible in a radial direction by at least 0.1 mm when the insulating layer is clamped with force required for operation of the bearing, the bearing body being immobile relative to the housing when operating under normal loads.

5. A kit for assembling a spherical bearing with selectable electrical conductivity as constructed in accordance with claim 1 wherein the body includes a threaded bore, the first and the second means for limiting movement of the body relative to the housing comprising a pin, each pin having a threaded section, the threaded sections of each pin mating with the threaded bore, the housing further including a recess, the selected pin being adapted to engage the threaded bore and project into the recess formed in the housing.

6. A spherical bearing, the bearing comprising a bearing housing of electrically conductive material, a bearing body of electrically conductive material, the bearing body being carried in the housing, a layer of electrically insulating material positioned between the body and the housing, the body having an annular convex supporting surface, the housing having an annular concave seating surface, the seating surface, the insulating layer and the supporting surface forming a ball and socket joint having a center around which the body is swivelable relative to the housing when the insulating layer is not clamped with the force required for operation of the bearing, the bearing further including positioning means for limiting movement of the body relative to the housing, the housing including a recess, the body including a bore, the positioning means comprising a pin seated into the bore and projecting into the recess, the positioning means further including means for electrically interconnecting the body with the housing, the means for electrically interconnecting the body with the housing including a compression spring formed of electrically conductive material, the compression spring bearing against both the recess and the pin, the pin being formed of electrically conductive material.

7. A spherical bearing as constructed in accordance with claim 6 wherein the compression spring comprises a helical spring, the pin further including a post projecting into the recess, the helical spring being seated on the post, the pin further including a collar having a diameter greater than that of the post, the spring bearing against the collar and an end of the recess.

* * * * *